United States Patent
Lotze et al.

(10) Patent No.: US 9,684,913 B2
(45) Date of Patent: Jun. 20, 2017

(54) RETAIL PHOTO SYSTEM CONFIGURATION MODULE AND SYSTEM

(71) Applicant: KODAK ALARIS, INC., Rochester, NY (US)

(72) Inventors: Andrew L. Lotze, Rochester, NY (US); Joseph A. Manico, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 35 days.

(21) Appl. No.: 14/149,413

(22) Filed: Jan. 7, 2014

(65) Prior Publication Data
US 2015/0193846 A1 Jul. 9, 2015

(51) Int. Cl.
*G06Q 30/06* (2012.01)
*H04N 1/00* (2006.01)

(52) U.S. Cl.
CPC ..... *G06Q 30/0601* (2013.01); *H04N 1/00143* (2013.01); *H04N 1/00167* (2013.01); *H04N 1/00188* (2013.01); *H04N 1/00344* (2013.01); *H04N 1/00973* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

2004/0119990 A1\* 6/2004 Miller et al. ................... 358/1.2
2011/0130873 A1\* 6/2011 Yepez et al. .................. 700/237

OTHER PUBLICATIONS

Netgear R6100 WiFI Router User manual, available at http://www.downloads.netgear.com/files/GDC/R6100/R6100_UM_11Jul13.pdf, Jul. 2013.\*

\* cited by examiner

*Primary Examiner* — Ethan D Civan
*Assistant Examiner* — Ming Shui
(74) *Attorney, Agent, or Firm* — Hogan Lovells US LLP

(57) ABSTRACT

The present invention is a configuration module for a Retail Photo System. The configuration module is a memory module that provides system configuration information for use with a network connected Retail Photo System. Physical and digital controlled access to the configuration module is provided by a locking enclosure, password protected access, and an automatic scenario based activation means. Access to the configuration module is limited to authorized personnel and remote access, or via scenario based activation.

8 Claims, 5 Drawing Sheets

RETAIL PHOTO SYSTEM CONFIGURATION MODULE AND SYTSTEM

BACKGROUND OF THE INVENTION

Retail Photo Systems allow consumers, with little or no knowledge of digital imaging techniques or systems, to print, share, and create custom photo-centric gifts incorporating their own snapshots and video clips. These systems are configured with components and devices such as a computer processor, wireless routers, touch screen displays, printers, film and print scanners, DVD reader/writers, and payment mechanisms such as credit card readers. In addition, these systems also include an assortment of custom and commercially available software packages, graphics, templates, fonts, special effects, image quality and manipulation algorithms, media calibration setting, video, music, and sound clips, promotional and advertising content, pricing and payment systems, and "step by step" workflows and graphic user interfaces (GUIs) each customized to the individual retailer and system configuration. Problems occur because each of these Retail Photo Systems, with its unique set of components, devices, software, content, and billing schedules, require a unique set of drivers, content and software licenses, pricing information, retail specific graphics and features, and other configuration information. Manually updating and replicating this configuration information requires a trained and knowledgeable operator usually requiring a service call, is prone to errors, is time consuming, and makes the Retail Photo System unavailable to users during this process.

US published patent application 2006/0061804 titled "modular digital photofinishing system," incorporates a handheld image display and manipulation device that is capable of two-way wireless communication or communicating by way of a physical interface with a digital photofinishing system, such as a photo kiosk, in a retail venue. The system is modular with multiple optional input and output devices and media. Provisions are made for controlled digital and physical access to the portable devices, but the system lacks a configuration module that stores and provides configuration information. The portable devices can save user preference settings by associating users with individual user accounts.

US published patent application 2005/0114234 titled "software configuration of module dependent on history," incorporates a program controller which is arranged to automatically authorize, configure, or upgrade a program for a customer replaceable card of a system, the controller arranged to manage the program automatically, according to a license agreement, and according to a history of use of the hardware module. A supplier can track customer changes and enforce more easily different conditions for authorizing the program on different modules from different sources, having different levels of capability. There can be less interaction with the supplier to get specific authorizations. Using the history of the module can make it easier to determine whether it falls within the agreement with the customer and the history can be stored on the module. It can be used to ease inventory tracking and generate billing information. In this system the customer has access to a hardware module and the authorizations are provided by the supplier. This is counter to the system and method of the present invention where the customer has no access to the configuration, and license authorization is initiated by the configuration module.

US published patent application 2003/0009378 titled "wireless transmission of data to and from photofinishing equipment," describes the use of in-store photo processing equipment. Photo processing equipment including digital hybrid minilabs and kiosks are installed inside a retail store. This equipment contains a device that can send and receive data wirelessly. The digital hybrid minilab and/or kiosk can then engage in two-way wireless communication with other wirelessly enabled devices inside the retail store. These devices may be possessed by a consumer shopping at the retail store or installed at the retail store. When interacting with the device, the consumer may create or manipulate data, which is then transferred wirelessly back to the kiosk and/or digital hybrid minilab. This system can communicate with other devices but lacks a configuration module that is physically and digitally isolated from the retail personnel and customers. An automatic means to record and provide configuration information to a Retail Photo System that does not require operator intervention, is protected from unauthorized access, and is responsive to changes in the system and unique system configurations is needed. The present invention meets this need.

SUMMARY OF THE INVENTION

The invention provides a retail photo system comprising a) a display; b) a pointing device; c) a computer processor in communication with a router and at least one peripheral device; d) a remote business management system and a configuration module. The remote business management system sends updates to the computer processor using the router to periodically provide new content and configuration information to the retail photo system from an offsite location. The configuration module has a memory device containing configuration and license information for supporting software and content for the retail photo system. The computer processor provides the configuration module with periodic updates after the computer processor receives updates from the remote business management system. The configuration module can automatically initiate required licensing and configuration information for software and content without operator or retail photo sales clerk intervention. The configuration module is physically and digitally isolated from the computer processor during normal usage of the retail photo system and is only digitally accessible when initiated by the remote business management system, by a detected change to computer parameters or by an authorized operator. The configuration module is also preferably physically and digitally isolated from retail personnel and customers.

The retail photo system can also include a photo kiosk, digital minilab, digital order station for remote image product production at centralized facilities, or combination thereof.

Pointing devices include a touch screen, mouse, key board, a camera system with gesture recognition, a microphone system with voice recognition, or combination thereof.

Peripheral devices include a color thermal printer, inkjet printer, electro-photographic printer, a CD/DVD reader/writer, a hard copy media scanner, or combination thereof.

The content and configuration information includes retailer specific settings, graphic user interfaces, image editing tools, imaging algorithms, product pricing schedules, retailer specific trade dress and promotional offers, seasonal and decorative graphics, templates, print drivers, work flows, licenses, software, or combinations thereof.

The invention also provides a configuration module for use in a retail photo system, comprising: a) a memory device containing configuration and license information for supporting software and content for the retail photo system; b) a containment structure to prevent unauthorized access; and c) an automatic scenario based activation mode wherein the configuration module can automatically initiate required licensing and configuration information for software and content without operator or retail photo sales clerk intervention.

The configuration module is physically and digitally isolated from a computer processor during normal usage of the retail photo system and is only digitally accessible when initiated by a remote business management system, by a detected change to computer parameters or by an authorized operator. The configuration module is also preferably physically and digitally isolated from retail personnel and customers.

The invention also provides a method of a retail photo system startup using a configuration module of the invention. The method involves mounting the configuration module and then comparing configuration module data with retail photo system computer data. If the configuration module data matches the retail photo system data or vice versa, then the configuration module is un-mounted. Un-mounting means digitally disconnecting. If the data does not match, if after determining that a new peripheral device has been installed, peripheral driver and related data is located and saved on the configuration module and thereafter the configuration module is un-mounted. If the data does not match if after determining that a remote business management system or operator has updated the computer data, the updated data is located and saved on the configuration module and thereafter the configuration module is un-mounted. Alternatively, the computer is updated with data from the configuration module and thereafter the configuration module is un-mounted.

The invention also provides a method of installing a peripheral device in a retail photo system using a configuration module of the invention. The method involves installing a peripheral device on a computer of the retail photo system and mounting the configuration module. Configuration module data is compared with retail photo system computer data. If the configuration module data matches the retail photo system data or vice versa, then the configuration module is un-mounted. If the data does not match, if after determining that a new peripheral has been installed, peripheral driver and related data on the configuration module is located and saved on the configuration module, then the configuration module is un-mounted. If the data does not match if after determining that a remote business management system or operator has updated the computer data, updated data is located and saved on the configuration module and then configuration module is un-mounted. Alternatively, computer is updated with data from the configuration module and then the configuration module is un-mounted.

The invention also provides a method of installing new configuration data using a configuration module of the invention. The method involves changing a computer parameter by a remote business management system or by an operator, recording the change of computer parameter by the computer, and mounting the configuration module. The configuration module data is compared with retail photo system computer data. If the configuration module data matches the retail photo system data or vice versa, then the configuration module is un-mounted. If the data does not match, if after determining that a new peripheral has been installed, locating and saving peripheral driver and related data on the configuration module and then un-mounting the configuration module. If the data does not match if after determining that a remote business management system or operator has updated the computer data, locating and saving the updated data on the configuration module and then un-mounting the configuration module. Alternatively, the computer is updated with data from the configuration module and then the configuration module is un-mounted.

DETAILED DESCRIPTION

Figure 1:
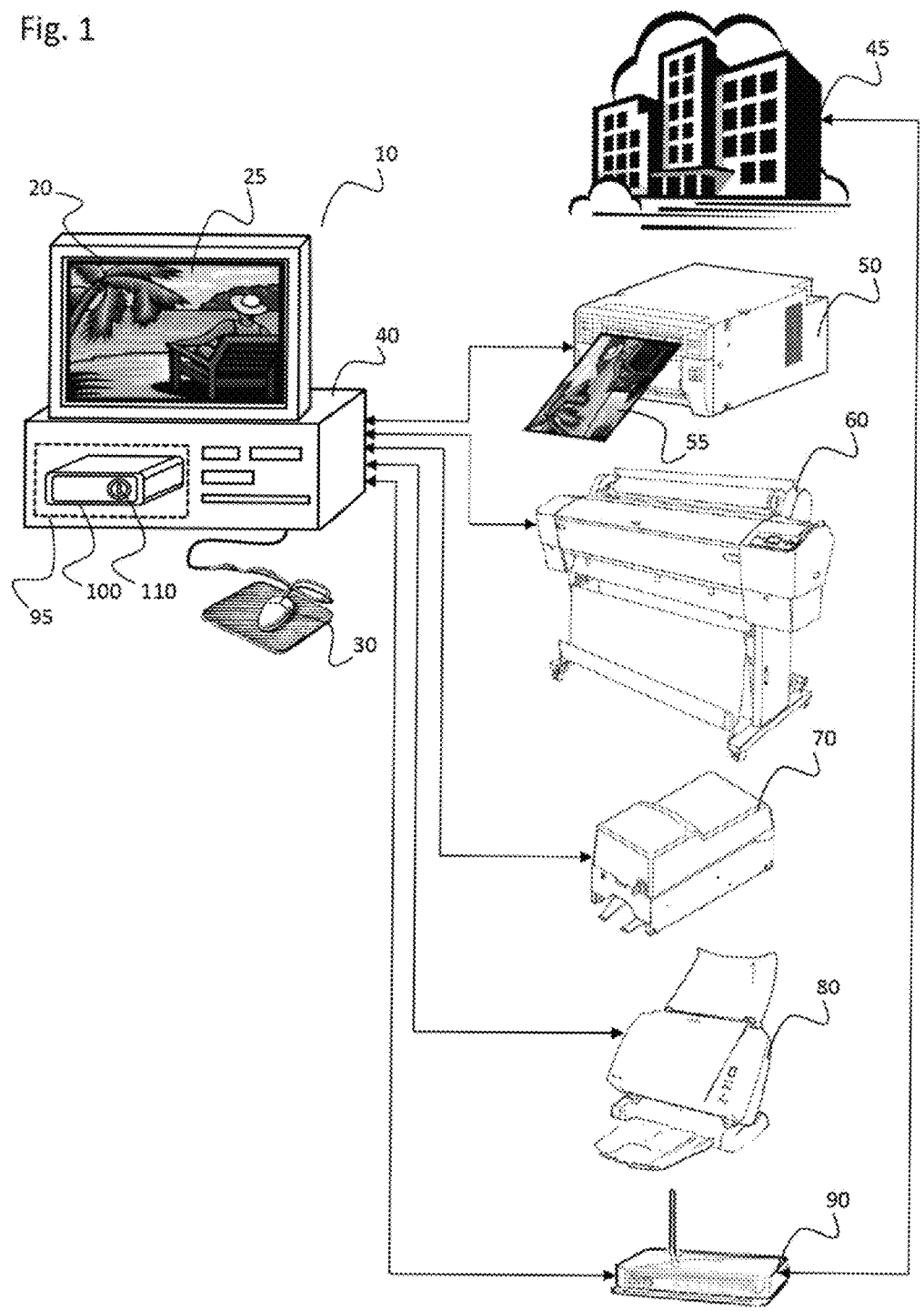
FIG. 1 is an illustration of the system of the present invention.

Explanations of certain terms used in the present application are provided below.

"Retail Photo System" is an image fulfillment system to enable consumers to create customized hard and soft copy photo products in retail environments. These systems include any combination of; photo kiosks, digital minilabs, color printers, scanners, CD and DVD reader/writers, servers for web hosting of digital photos, digital order stations, and the like.

"Remote Business Management" or "RBM" is a system to periodically provide new content and configuration information to the digital image fulfillment system from an offsite location.

"Configuration information" includes setup information, peripheral numbers and types, peripheral drivers, calibration information, specialized software, workflow instructions, pricing schedules, remote fulfillment access information, software and content licensing information, and retailer specific data.

"Content" includes graphics, backgrounds, and templates used to make and enhance photo products, music, specialized fonts, image product formats, manufacturer and retailer promotional, trade dress, and marketing communications.

"Centralized Imaging Services" or "CIS" is a remote wholesale production facility for image products that may be unsuitable for retail production such as photo books, photo customized apparel, posters, mouse pads, and the like.

"Advanced Unit Replacement" or "AUR" means a new or replacement computer is shipped to a retail site when the existing computer is identified as malfunctioning.

Retail Photo Systems are designed to enable consumers to create customized hard and soft copy photo products in retail environments. Retail Photo Systems are used by consumers who are guided by on-screen interactive instructions and a graphic user interface. Retail clerks are available to perform routine maintenance, answer consumer questions, perform basic system calibration, and reload print media and soft-copy media such as DVD's. As such, retail clerks receive a minimum of training, frequently change jobs, and are typically unsuited for more complex tasks. Retail Photo Systems include any combination of photo kiosks, digital minilabs, color printers, hardcopy scanners, CD and DVD reader/writers, servers for web hosting of digital photos, and digital order stations for remote image product production at centralized facilities. Consumers use their hard copy photographs that can be digitally scanned at the retail site and/or personal digital images accessed via their smart phones, social media accounts, USB memory devices, SD cards, memory sticks, or stored on DVD media that are brought to the Retail Photo System. Consumers load their images onto these digital image fulfillment systems through the appropriate wired or wireless interface means and follow on-screen, guided instructions to create photo products including: photographic prints, enlargements, photo books, photo calenderers, DVDs, web hosted photo albums, movies, and slide shows, photo t-shirts, photo apparel and accessories, mugs, and mouse pads. Some photo products are created at the retail site, while other more complex image products, such as photo books and photo apparel, are compiled and specified at the retail site and the digital image and instructions are sent to and produced at a remote production facility.

The Retail Photo Systems also include graphic user interfaces, image editing tools, imaging algorithms, product pricing schedules, retailer specific trade dress and promotional offers, seasonal and decorative graphics, templates, print drivers, and work flows. Problems arise when equipment or computers fail and components are replaced or added requiring drivers, licenses, and software installation. New installations also require a series of software modules and retailer specific settings and content. In some cases the computer network capabilities within the retail environment may lack the capacity to support configuration from a remote location or the local network usage within the retail environment may interfere with a time consuming and data intensive installation. In addition, seasonal and regional promotions, pricing, and related content must routinely be provided to the digital image fulfillment system at the retail location to refresh the product offerings and to coincide with upcoming holidays and events. However, installing software, setting up, and configuring a digital image fulfillment system can be a formidable task for a retail clerk that typically operates these systems.

FIG. 1 illustrates a Retail Photo System 10 with touch screen display 20, displayed user image 25, and pointing device 30. Pointing device 30 is shown as a computer mouse that can be used in addition to or in lieu of the touch screen, but can be any device or combination of devices suitable to provide instructional input and user selections to the Retail Photo System 10, such as a key board, a camera system with gesture recognition, or a microphone system with voice recognition, which are well known in the art and not shown. Computer processor 40 is used to provide image processing, a graphic user interface, imaging workflow, and to manage input, output, and operation of the peripheral devices. Typical peripheral devices for a Retail Photo System include a Photo Printer 50, which can be a color thermal, inkjet, or electro-photographic printer for prints, enlargements, photo albums and greeting cards as shown with printed user image 55. Other peripheral devices include a Large Format Photo Printer 60 such an inkjet printer for making posters and banners, a CD/DVD Reader/Writer 70 for soft copy audio visual image products or storage, and Scanner 80 for digitizing hard copy media such as prints, slides, and negatives. Router 90 is also included to send images and photo product orders to remote locations for storage and fulfillment. Router 90 is also used to send updates to Computer processor 40 using a Remote Business Management system 45 which is communicatively connected to Router 90 to periodically provide new content and configuration information to the Retail Photo System 10 from an offsite location. The Remote Business Management system 45 is also used to monitor the status Retail Photo System 10 and the connected peripheral devices. In an alternative configuration one or more of the peripheral devices can be connected to Computer processor 40 via the Router 90 such as with a networked printer configuration, not shown.

Also shown in FIG. 1, Configuration Module 100 can be seen through cut-away view 95 in Computer processor 40. Another embodiment incorporates the Configuration Module 100 into the Retail Photo System enclosure. Configuration Module 100 can also be a separate device connected to the Retail Photo System 10. Configuration Module 100 can include a locking mechanism/door 110 to prevent unauthorized access to the memory device 120 inside Configuration Module 100 as shown in FIG. 2b.

Figure 2A:
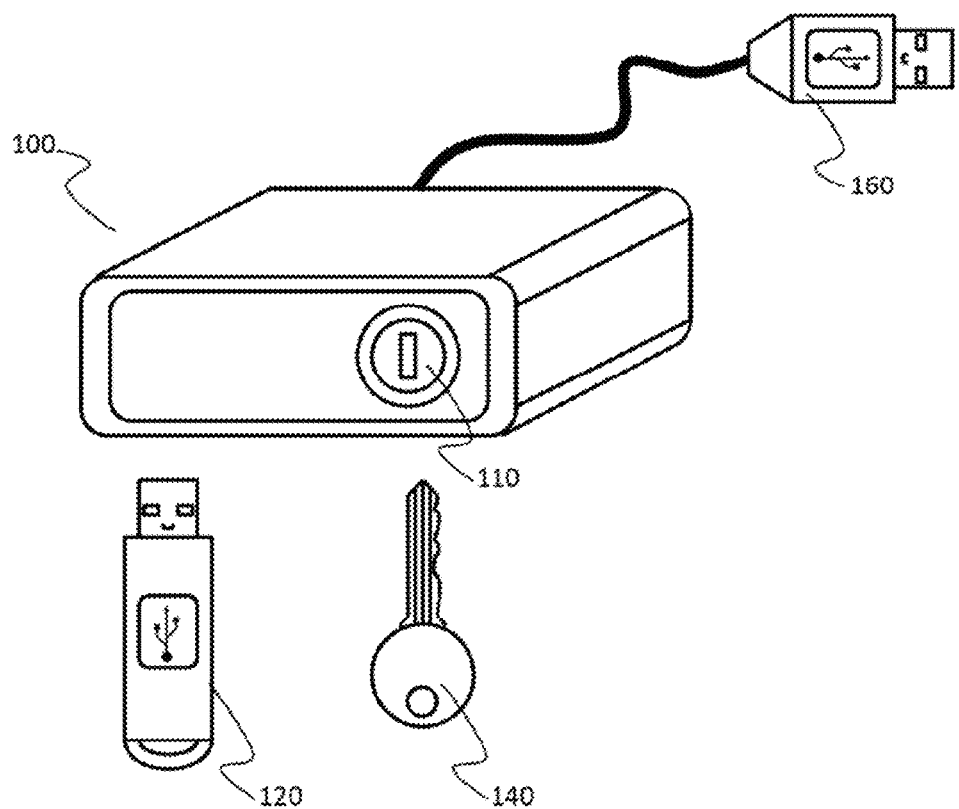
FIG. 2a is a perspective view of the Configuration Module in the closed position.
Figure 2B:
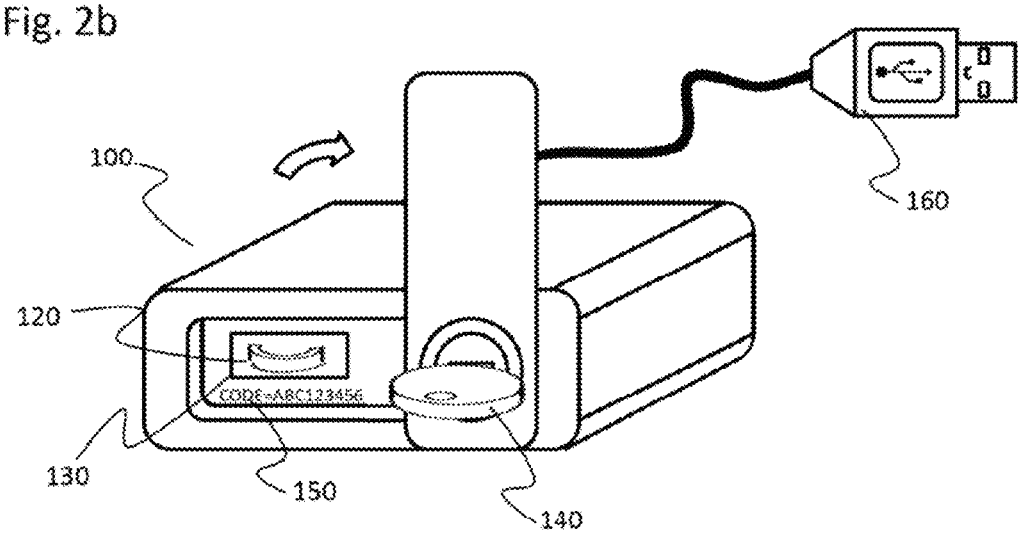
FIG. 2b is a perspective view of the Configuration Module in the opened position.

FIG. 2a shows Configuration Module 100, with locking mechanism/door 110, which uses key 140 to provide access to authorized users and to prevent access from unauthorized users. FIG. 2a also shows memory device 120. Although a key 140 and locking mechanism/door 110 are shown, any suitable locking system such as a combination or an electronic lock can be used or alternatively a special tool such as a 5 sided Allen key and compatible screw can be used to secure locking mechanism/door 110 and prevent unauthorized access or tampering.

Configuration module 100, of the present invention, includes a small memory device 120 with all of the required configuration and license information supporting the software and content for a specific Retail Photo System 10. Memory device 120 is connected to and communicates with the Retail Photo System 10 computer processor 40, which provides memory device 120 with periodic updates, which the computer processor 40 receives from the Remote Business Management System. For example, as new peripheral devices are installed the configuration module is automatically updated (by the remote Business Management System or by software loaded on to Computer processor 40).

Memory device 120 has enough storage capacity to provide setup and configure a specific Retail Photo System 10. In addition to configuring the Retail Photo System 10, memory device 120 is used to automatically initiate all of the required licensing and configuration information for third party software and content without operator or clerk intervention. The configuration module is also automatically accessed when the computer is replaced without intervention from the retail operator, e.g. "scenario based automatic workflow modification." Access to the configuration module, to initiate it or to update it, is provided via the Remote Business Management System, or locally via password to prevent access by unauthorized users.

Memory device 120 comprises a volume of read-write memory such as solid state or magnetic memory with sufficient capacity to store the required configuration information. The configuration module memory can comprise; single solid state, redundant solid state, single magnetic memory, redundant magnetic memory, or combination thereof.

Configuration module 100 and memory device 120 also provide the required configuration information for the software, applications, and content to process, enhance, print, store, transmit, and transactional information to process the user provided images or video to create the user selected image products. The configuration module 100 can be used to simplify and expedite setting up multiple Retail Photo Systems within a retail environment or related retail network utilizing similar configurations. For example, once the first of a group of similar Retail Photo Systems for a specific retailer is configured, the remaining Retail Photo Systems are updated with the configuration module). The configuration module 100 also provides the ability as well as the information for the computer to obtain the required updates and content from a remote location via the internet.

Situations that might require configuration updates include computer failure, new printer/peripheral install, content refresh, system expansion—more hardware/memory/features, new media such as type/lot based print media calibration data, new pricing schedules, seasonal/periodic promotions, configuration update, date triggered auto-licensing renewal, 3rd party software update, and automated sequence of operation.

The configuration module compares the configuration data stored on the configuration module and the configuration data stored of the processor. For example, dates and times of the various data files and version numbers can also be compared to reconcile between the two.

The configuration module 100 is connected to the computer processor 40 via USB Connector 160 or similar bi-directional communication means such as SATA/eSATA. As shown in FIG. 2b, key 140 is inserted into locking mechanism/door 110 providing access to memory slot 130 with memory device 120 inserted. Alpha-numeric code 150 is provided as additional security feature, which is used by an authorized operator accessing the configuration module 100. Once locking mechanism/door 110 is unlocked and opened, an authorized operator can view and use the alpha-numeric code 150 and user interface 30 to manually mount the configuration module 100 and to initiate a comparison between the configuration module 100 memory device 120 and the computer processor 40. This mode may also be used to access special functions such as used for system diagnostics and maintenance. In addition, software running on computer processor 40 is designed to detect scenarios that require mounting the configuration module 100, detecting the new information, and the source, and recipient of the data transfer.

Configuration module 100 is separate from the computer processor 40 so that if the computer processor or related hard drive is replaced, all of the saved settings, operational configurations, and licenses and the like can be restored and the system can be up and operational quickly with little to no clerk involvement. The configuration module 100 is both physically and digitally isolated from the Retail Photo System 10 and computer processor 40 and is only digitally accessible when initiated by Remote Business Management System, a detected change to the computer parameters, or by authorized operator with the required access code via the Retail Photo System 10.

The configuration module is also physically and digitally inaccessible to the retail operators and users. The configuration module may be concealed and thus require a service technician with knowledge of the location to find it in the system. The configuration module may be in a containment structure to prevent unauthorized access, theft, or tampering and can only be accessed with a physical key and an access code. Optionally, an alpha-numeric access code is printed inside the locked configure module enclosure for access by a service technician.

As shown in FIGS. 2a and 2b, the configuration module is encased in a key 140 accessible reinforced housing. Alternatively, the configuration module is concealed in an innocuous component or structure such as an inline noise suppressor or USB port replicator with a false front plate or bezel that conceals the memory from view and ready access.

The Retail Photo System 10 on startup verifies that the configuration module 100 is connected and operational. If the configuration module 100 is not accessible during periodic system checks and updates by the connected computer a failure notice is sent to a trained operator via Remote Business Management System and/or on-screen to alert clerk to contact service to investigate.

The configuration module retains all configuration information and content and is isolated from the computer and computer operating system during normal usage of the Retail Photo System. The configuration module receives updates only when new configuration information and content is provided to the PC. The configuration module operates automatically and is not accessible to the customer or clerk. The configuration module is only mounted when new configuration information or content is received or when a computer fails, is replaced, or is upgraded. The configuration module retains all software and content licenses, which are reapplied automatically if the computer fails, is replaced, upgraded, or when periodic license renewals are required.

The configuration module is different from a hard drive/backup system because only critical configuration information is stored and the configuration module is only accessible under certain conditions and is physically isolated to prevent unauthorized access.

Figure 3:
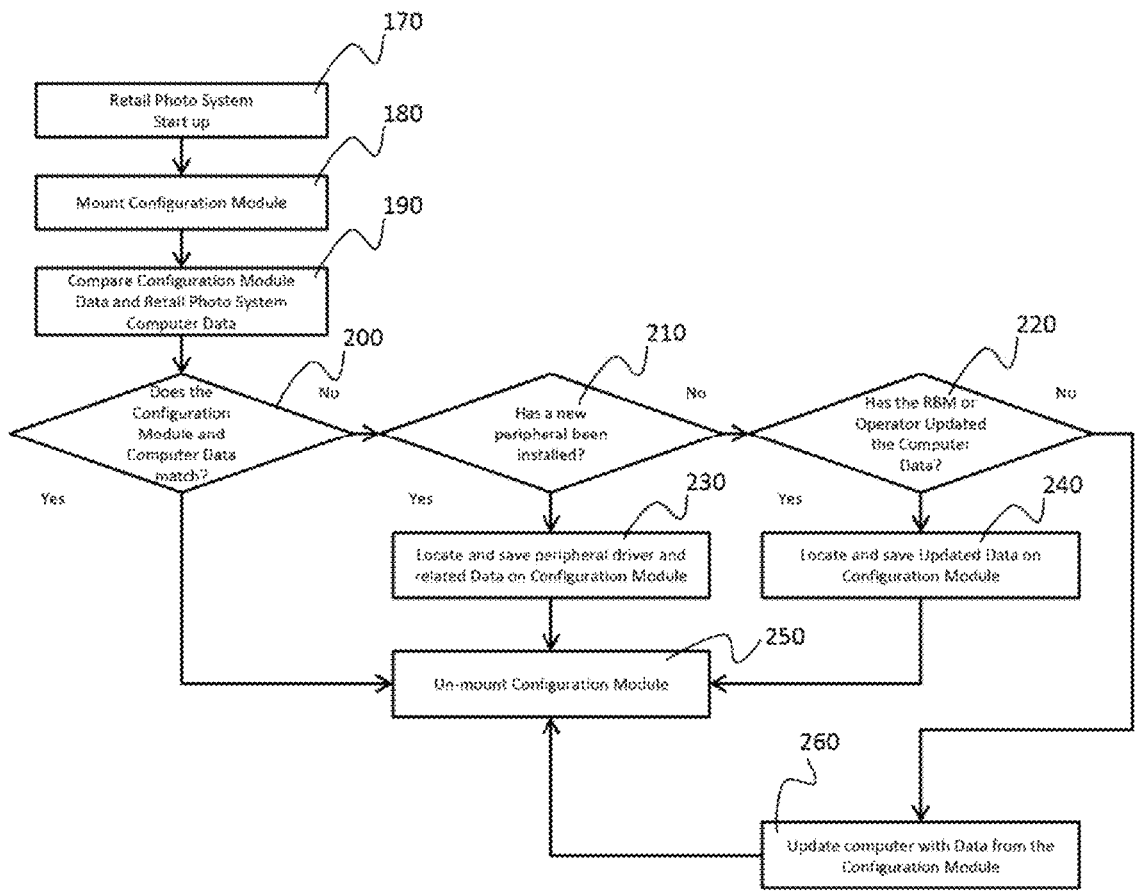
FIG. 3 is a flowchart illustrating the start-up scenario of the system.

The flowchart of FIG. 3 shows the start-up scenario method of the present invention with the initiation of the Retail Photo System 10. The initiation of Retail Photo System 10, as shown in step 170, can occur at morning start up, during a reboot, a hard drive fails, or if computer processor 40 is replaced or upgraded. At step 180 the configuration module 100 is mounted and at step 190 the configuration data stored on memory device 120 is compared to the configuration data stored on computer processor 40 and at decision step 200, if the data is matched the configuration module 100 is un-mounted at step 250. If at decision step 200 it is determined that the configuration data does not match, decision step 210 checks computer processor 40 to determine if a new peripheral device has been installed. If a new peripheral device has been installed the device driver and related data are copied to the memory device 120 in configuration module 100 at step 230 and when complete the configuration module 100 is un-mounted at step 250. If at decision step 210 it is determined that a peripheral device has not been installed decision step 220 determines if the configuration data in computer processor 40 has been updated by the Remote Business Manager, by an authorized operator, or service technician. If at decision step 220 it is determined that the computer processor 40 configuration data has not been changed, then at step 260 the configuration module 100 is used to update the configuration data stored in computer processor 40 and then the configuration module is un-mounted at step 250. If at decision step 220 it is determined that the configuration data stored in computer processor 40 has been updated then at step 240 the updated configuration data is located and is copied to memory device 120 in configuration module 100 and when completed configuration module 100 is then un-mounted at step 250.

Figure 4:
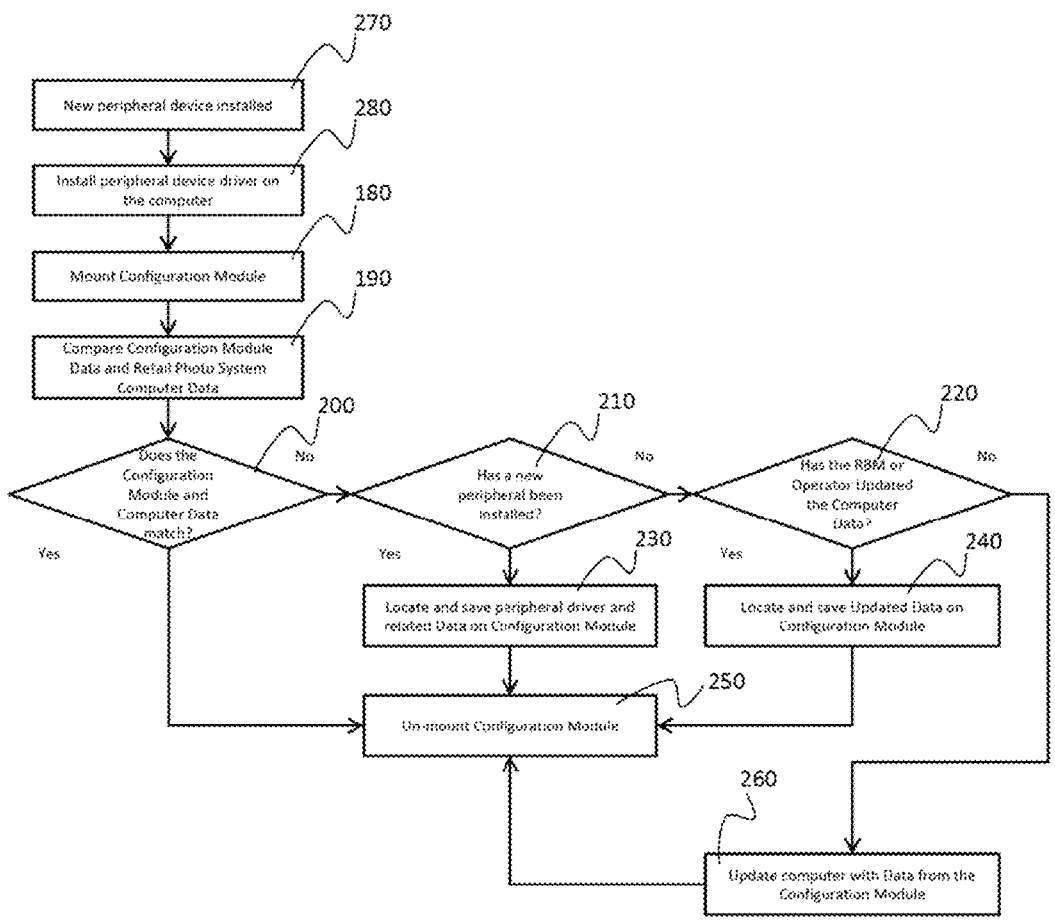
FIG. 4 is a flowchart illustrating the peripheral installation scenario of the system.

The flowchart of FIG. 4 shows the peripheral installation scenario method of the present invention with peripheral installation on the Retail Photo System 10. The peripheral installation on Retail Photo System 10, as shown in step 270, can be any number or type of peripheral devices as shown in FIG. 1. At step 280 the peripheral device drive is copied to computer processor 40 and at step 180 the configuration module 100 is mounted. At step 190 the configuration data stored on memory device 120 is compared to the configuration data stored on computer processor 40 and at decision step 200, if the data is matched the configuration module 100 is un-mounted at step 250. If at decision step 200 it is determined that the configuration data does not match, decision step 210 checks computer processor 40 to determine if a new peripheral device has been installed. If a new peripheral device has been installed the device driver and related data are copied to the memory device 120 in configuration module 100 at step 230 and when complete the configuration module 100 is un-mounted at step 250. If at decision step 210 it is determined that a peripheral device has not been installed decision step 220 determines if the configuration data in computer processor 40 has been updated by the Remote Business Manager, by an authorized operator, or service technician. If at decision step 220 it is determined that the computer processor 40 configuration data has not been changed, then at step 260 the configuration module 100 is used to update the configuration data stored in computer processor 40 and then the configuration module is un-mounted at step 250. If at decision step 220 it is determined that the configuration data stored in computer processor 40 has been updated then at step 240 the updated configuration data is located and is copied to memory device 120 in configuration module 100 and when completed configuration module 100 is then un-mounted at step 250.

Figure 5:
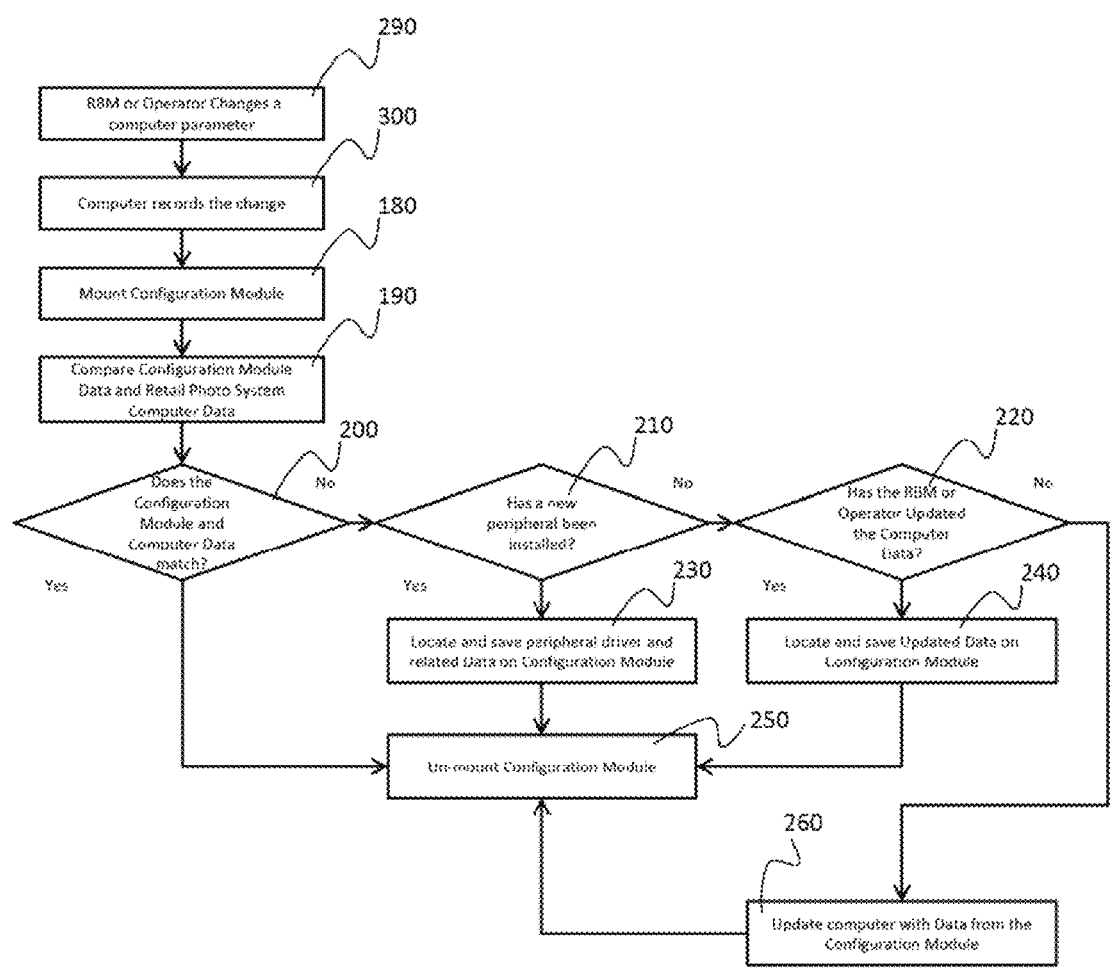
FIG. 5 is a flowchart illustrating the new configuration data scenario of the system.

The flowchart of FIG. 5 shows the new configuration data scenario method of the present invention with new data provided to the Retail Photo System 10 by the Remote Business Manager, by an authorized operator, or service technician. The new configuration data provided to Retail Photo System 10, as shown in step 290, can be type of configuration data as previously discussed. At step 300 the new configuration data is copied to computer processor 40 and at step 180 the configuration module 100 is mounted. At step 190 the configuration data stored on memory device 120 is compared to the configuration data stored on computer processor 40 and at decision step 200, if the data is matched the configuration module 100 is un-mounted at step 250. If at decision step 200 it is determined that the configuration data does not match, decision step 210 checks computer processor 40 to determine if a new peripheral device has been installed. If a new peripheral device has been installed the device driver and related data are copied to the memory device 120 in configuration module 100 at step 230 and when complete the configuration module 100 is un-mounted at step 250. If at decision step 210 it is determined that a peripheral device has not been installed decision step 220 determines if the configuration data in computer processor 40 has been updated by the Remote Business Manager, by an authorized operator, or service technician. If at decision step 220 it is determined that the computer processor 40 configuration data has not been changed, then at step 260 the configuration module 100 is used to update the configuration data stored in computer processor 40 and then the configuration module is un-mounted at step 250. If at decision step 220 it is determined that the configuration data stored in computer processor 40 has been updated then at step 240 the updated configuration data is located and is copied to memory device 120 in configuration module 100 and when completed configuration module 100 is then un-mounted at step 250.

Other embodiments to automatically initiate the data comparison between the Retail Photo System 10 and computer processor 40 and the configuration module 100 and updating the data on the appropriate device include; at periodic intervals, when initiated by a service technician, when a peripheral device receives new firmware, or when new output media calibration information has been added. It will be understood that, although specific embodiments of the invention have been described herein for purposes of illustration and explained in detail with particular reference to certain preferred embodiments thereof, numerous modifications and all sorts of variations may be made and can be effected within the spirit of the invention and without departing from the scope of the invention.

PARTS LIST

10 Retail Photo System
20 Touch Screen Display
25 Displayed User Image
30 Pointing Device
40 Computer Processor
45 Remote Business Manager
50 Photo Printer
55 Printed User Image
60 Large Format Photo Printer
70 CD/DVD Reader/Writer
80 Scanner
90 outer
95 Cut-away view
100 Configuration Module
110 Locking Mechanism/Door
120 Memory Device
130 Memory Slot
140 Key
150 Alpha-numeric Code
160 Connector
170 Start-up Step
180 Mounting Step
190 Compare Step
200 Match Decision Step
210 Peripheral Decision Step
220 RBM Decision Step
230 Peripheral Update Configuration Module Step
240 RBM Update Configuration Module Step
250 Update Computer Step
260 Un-mount Configuration Module Step
270 New Peripheral device Step
280 Install Peripheral device driver Step
290 RBM or Operator Change Step
300 Computer records the change Step

The invention claimed is:
1. A retail photo system comprising:
a. a display;
b. a pointing device;
c. a computer processor in communication with a router and at least one peripheral device;
d. a remote business management system;
wherein the remote business management system sends updates to the computer processor using the router to periodically provide new content and configuration information to the retail photo system from an offsite location;
e. a concealed configuration module having a memory device containing configuration and license information for supporting software and content for the retail photo system wherein the concealed configuration module is concealed in an inline noise suppressor or USB port replicator;

wherein the computer processor provides the configuration module having a memory device with periodic updates after the computer processor receives updates from the remote business management system;

wherein the configuration module having a device can automatically initiate required licensing and configuration information for software and content without operator or retail photo sales clerk intervention;

wherein the configuration module is physically and digitally isolated from the computer processor during normal usage of the retail photo system and is only digitally accessible when initiated by the remote business management system, by a detected change to computer parameters or by an authorized operator; and wherein the configuration module is encased in a reinforced housing comprising a locking system, and the configuration module comprises an alpha-numeric access code printed thereon that is visible when the reinforced housing is unlocked and opened by the authorized operator to access the configuration module.

2. The retail photo system of claim 1 wherein the configuration module is physically and digitally isolated from retail personnel and customers.

3. The retail photo system of claim 1 wherein the change to computer parameters is selected from the group consisting of computer failure, computer replacement, computer upgrade, addition of another computer.

4. The retail photo system of claim 1 further comprising a photo kiosk, digital minilab, digital order station for remote image product production at centralized facilities, or combination thereof.

5. The retail photo system of claim 1, wherein the pointing device is a touch screen, mouse, key board, a camera system with gesture recognition, a microphone system with voice recognition, or combination thereof.

6. The retail photo system of claim 1, wherein the peripheral device is a color thermal printer, inkjet printer, electro-photographic printer, a CD/DVD reader/writer, a hard copy media scanner, or combination thereof.

7. The retail photo system of claim 1, wherein the content and configuration information includes retailer specific settings, graphic user interfaces, image editing tools, imaging algorithms, product pricing schedules, retailer specific trade dress and promotional offers, seasonal and decorative graphics, templates, print drivers, work flows, licenses, software, or combinations thereof.

8. A configuration module for use in a retail photo system, comprising:
   a. a memory device containing configuration and license information for supporting software and content for the retail photo system;
   b. a containment structure to prevent unauthorized access; and
   c. an automatic scenario based activation mode wherein the configuration module can automatically initiate required licensing and configuration information for software and content without operator or retail photo sales clerk intervention;

wherein the configuration module is concealed within the retail photo system and physically and digitally isolated from a computer processor during normal usage of the retail photo system and is only digitally accessible when initiated by a remote business management system, by a detected change to computer parameters or by an authorized operator;

wherein the concealed configuration module is concealed in an inline noise suppressor or USB port replicator;

wherein the configuration module is physically and digitally isolated from retail personnel and customers; and wherein the configuration module is encased in a reinforced housing comprising a locking system, and the configuration module comprises an alpha-numeric access code printed thereon that is visible when the reinforced housing is unlocked and opened by the authorized operator to access the configuration module.

* * * * *